United States Patent
Sterzbach

(10) Patent No.: US 10,484,109 B2
(45) Date of Patent: Nov. 19, 2019

(54) TEST ARRANGEMENT AND TEST METHOD

(71) Applicant: Rohde & Schwarz GmbH & Co. KG, München (DE)

(72) Inventor: Bernhard Sterzbach, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/901,999

(22) Filed: Feb. 22, 2018

(65) Prior Publication Data
US 2019/0260482 A1 Aug. 22, 2019

(51) Int. Cl.
| H04B 17/00 | (2015.01) |
| H04W 24/00 | (2009.01) |
| H04B 17/15 | (2015.01) |
| H04W 64/00 | (2009.01) |
| H04B 17/29 | (2015.01) |

(52) U.S. Cl.
CPC .............. *H04B 17/15* (2015.01); *H04B 17/29* (2015.01); *H04W 64/00* (2013.01)

(58) Field of Classification Search
CPC ........ H04B 17/15; H04B 17/29; H04B 17/18; H04W 64/00; H04W 24/02; H04W 24/08
See application file for complete search history.

(56) References Cited

U.S. PATENT DOCUMENTS

| 2010/0110916 A1* | 5/2010 | Pratt, Jr. ................ H04L 43/50 370/252 |
| 2010/0197299 A1* | 8/2010 | Huber ................... H04W 24/06 455/425 |
| 2010/0285753 A1* | 11/2010 | Foegelle ................ H04B 17/21 455/67.12 |
| 2013/0286860 A1* | 10/2013 | Dorenbosch .......... H04W 24/06 370/252 |
| 2016/0197685 A1* | 7/2016 | Tsai .................... H04B 17/0085 370/242 |
| 2016/0285572 A1* | 9/2016 | Manghal ............. H04B 17/0085 |
| 2018/0102860 A1* | 4/2018 | Emmanuel ............ H04W 28/04 |
| 2018/0351662 A1* | 12/2018 | Pan ......................... H04B 17/15 |
| 2019/0028216 A1* | 1/2019 | Naseef ................. H04B 17/345 |
| 2019/0049591 A1* | 2/2019 | Maier ...................... G01S 19/23 |

* cited by examiner

*Primary Examiner* — Andrew Wendell
(74) *Attorney, Agent, or Firm* — Westman, Champlin & Koehler, P.A.

(57) ABSTRACT

The present invention provides a test arrangement and a test method for testing a device under test. The device under test may be tested by means of a test controller. Furthermore, a number of impairment devices are provided for applying impairments on a radio communication link of the device under test. The impairment devices may be controlled by an impairment controller. In this way, it is possible to apply impairments corresponding to impairments of a particular geographical area or a desired route, without moving the device under test to the respective geographical position. Accordingly, impairments of a particular geographical area can be applied without moving the test arrangement to the respective geographical area.

15 Claims, 3 Drawing Sheets

TEST ARRANGEMENT AND TEST METHOD

TECHNICAL FIELD

The present invention relates to a test arrangement. The present invention further relates to a test method.

BACKGROUND

Although applicable in principle to any wireless test system, the present invention and its underlying problem will be hereinafter described in combination with testing a wireless communication device.

The use of wireless communication systems for communication between electronic devices increases continuously with advance of high speed wireless data communication.

During development or production of wireless communication devices it is necessary to thoroughly test the devices. In general, the devices might be tested in real world radio conditions using an existing network infrastructure. In this way, the manufacturers try to find abnormal behavior or insufficient performance of a device under test.

Testing a device in the field under real world conditions requires to travel to an appropriate location and move around the device under test in this location. Accordingly, such tests cause high costs for traveling to the respective local region and build up the test scenario in this region.

Accordingly, there is a need for performing appropriate tests in the field under real world conditions which can reduce the required costs in terms of time and money. Furthermore, there is a need for testing a device under test in the field which can be performed even faster and more flexible.

Against this background, the problem addressed by the present invention is to provide a test arrangement and a test method for wireless devices which can perform a testing of the wireless device under real world conditions.

SUMMARY

The present invention solves this problem with a test arrangement with the features of claim 1 and by a test method with the features of claim 17.

According to a first aspect, a test arrangement for testing a device under test is provided. The test arrangement comprises a test controller, a number of impairment devices and an impairment controller. The test controller comprises a control interface for interacting with the device under test. The test controller is adapted to control the device under test to perform a predetermined test operation. Each of the number of one or more impairment devices is adapted to apply test impairments to a radio communication link of the device under test. The impairment controller is communicatively coupled to the number of impairment devices. The impairment controller is further adapted to control the number of impairment devices to apply the test impairments, respectively.

According to a further aspect, a test method for testing a device under test is provided. The test method comprises controlling the device under test by a test controller to perform a predetermined test operation. The test method further comprises applying test impairments to a radio communication link of the device under test by a number of one or more impairment devices, and controlling the number of impairment devices by an impairment controller.

The present invention is based on the fact that an operation of a wireless device in a real world scenario can be influenced by many impairments. Such impairments may be, for example, an attenuation of a wireless signal between the wireless device and a further communication partner, a reflection of the wireless signal, in particular interferences due to multiple reflections, frequency shifts, e.g. a Doppler shift, due to a high movement speed of the wireless device, a (temporal) loss of a signal, an unsuccessful handover from one communication partner to another communication partner, or may other impairments which may occur during the operation of a wireless device in the field. In particular, the impairments may depend on the geographical environment, the local position and the configuration of the communication partners in the field, a number of further devices which may emit or receive wireless signals, or many other parameters. Accordingly, it is very difficult or even impossible, to simulate such conditions and impairments in a laboratory or an indoor test environment.

However, traveling to multiple different geographical locations, installing the test equipment at all these locations and performing the respective tests causes high costs in terms of time and money. This makes it very difficult or even impossible to cover all test scenarios for testing a device under test.

Accordingly, the present invention tries to apply impairments, in particular impairments related to a particular geographical area or a predetermined movement in the geographical area. For example, it may be possible to identify one or more impairments of a particular geographical environment and to apply these impairments when testing a device under test, even when the respective device under test is not located in this geographical area. Accordingly, it will be not necessary to travel to a particular geographical area, install the test environment at this geographical area and to perform the respective test sequence. Moreover, the test sequence can be performed at any appropriate geographical position by applying the related impairments to the test scenario.

In this way, the time and the required traveling costs to a particular geographical environment can be reduced. Moreover, it is possible to apply different impairments related to different geographical areas to a same test arrangement. In this way, the test arrangement has to be set up only once and thereafter it is possible to apply test sequences related to different geographical areas. Thus, the time for testing a device under test under different conditions, in particular under different conditions related to different geographical positions can be significantly reduced.

The test arrangement may comprise a test controller for setting up the device under test, controlling the device under test during the test operation, receiving data and/or signals from the device under test and analyzing the received signals/data from the device under test in order to evaluate the operation and/or performance of the device under test during the test operation. For this purpose, the test controller may comprise a control interface for interacting with the device under test. The control interface may be any kind of appropriate interface for communicatively coupling the test controller and the device under test. In particular, the control interface may apply a wired or wireless communication link between the test controller and the device under test. For example, the communication between the test controller and the device under test may be based on a predetermined standardized communication protocol or proprietary protocol for a communication between the test controller and the device under test.

Furthermore, a number of one or more impairment devices may be applied to the test arrangement. Each impairment device of the test arrangement may apply predetermined test impairments. In particular, the test impairments may relate to impairments on a radio communication link of the device under test. In this way, it is possible to apply any kind of impairment which might occur in the communication link between the device under test and a further communication partner. For example, such a further communication partner may be a base station of a wireless communication network, a further wireless device, an access point of a wireless network or any other device for transmitting or receiving wireless signals.

The impairment devices may apply any kind of appropriate impairment to a signal transmitted by the radio communication link of the device under test. For example, a predetermined fixed or variable attenuation may be applied to a signal, a frequency of a signal on a radio communication link may be shifted by a predetermined frequency shift, the signal may be filtered to attenuate or eliminate signals related to a predetermined frequency or frequency range or frequencies related to a number of one or more channels, or an additional signal may be added to the original signal on the radio communication link. For example, the additional signal may correspond to an additional noise, a signal corresponding to a reflected signal, one or more signals emitted by further wireless communication devices, or any other kind of interfering signals. However, it is understood that the impairments applied to the signal on the radio communication link of the device under test are not limited to the above described examples. Moreover, any other kind of impairment may be also applied to the radio communication link.

Furthermore, the impairments are not only limited to impairments applied outside the device under test. Moreover, it may be also possible to apply impairments within the device under test, especially within the circuits of the device under test. For example, it may be possible to apply a de-tuning of the device under test to simulate a frequency shift, for example caused by a high speed movement of the device under test, or apply particular instructions or signals to the device under test in order to simulate an unsuccessful handover, disturbances due to a temporal or full loss of a control signal or any other kind of impairment during the operation of the device under test. It is understood, that the impairments applied to the device under test are not limited to the above described types of impairments. Moreover, any other appropriate impairment or of setting of the device under test for simulating an impairment may be also possible.

The operation of the number of one or more impairment devices for applying the test impairments may be controlled by an impairment controller. For example, the impairment controller and the respective impairment devices may be communicatively coupled by an appropriate communication link. For this purpose, the impairment controller and the impairment devices each may comprise an appropriate interface for communicatively connecting the respective devices. The impairment controller may control each of the impairment devices in order to apply a desired test impairment. It is understood, that the individual impairment devices may be configured to apply different kinds of impairments. Accordingly, the impairment controller may control the operation of the individual impairment devices for applying the respective test impairments, separately. In particular, each impairment device may be coupled with the impairment controller, separately. For example, a wired communication link between the impairment controller and each impairment device may be used. However, it is understood, that any other kind for applying a communication between the impairment controller and the impairment devices may be possible, too. For example, the impairment controller and the number of impairment devices may be coupled by a bus link. For example, a standardized bus system or communication protocol may be used for a communication between the impairment controller and the impairment devices.

The test controller and the impairment controller may comprise, for example, general purpose processors with corresponding instructions. Further, the test controller and the impairment controller may comprise interfacing elements which are coupled to the respective processor, to receive signals from the device under test or further devices, and provide the received signals to the respective processor. Each interfacing element may comprise, for instance, analogue to digital converters for converting the received signals into digital data which may be processed by the processor. Such dedicated digital to analogue converters may be coupled, for example, to the processor via a serial or parallel digital interface. Between the digital to analogue converters and an input port of the respective device, further analogue elements like e.g. filters comprising resistors, capacitors and inductors, or the like may be provided.

In a possible embodiment, the test controller may comprise first instructions that cause the test controller to perform the control of the device under test during the test operation.

Accordingly, in a possible embodiment, the impairment controller may comprise second instructions that cause the impairment controller to control the connected impairment devices for applying the desired test impairments.

As already mentioned above, the test controller and/or the impairment controller may comprise hardware elements like a processing unit. However, the test controller and/or the impairment controller may also be software implemented at least in part. The first/second instructions may therefore be stored in a memory that is coupled to a general purpose processor, for example via a memory bus. The processor may further execute an operating system that loads and executes the first/second instructions. The processor may be an Intel processor that runs a Windows or Linux operating system that loads and executes the first/second instructions. In another embodiment, the processor may be a processor of a measurement device that may run, for example, an embedded operating system that loads and executes the first/second instructions.

Further embodiments of the present invention are subject of the further sub-claims and the following description referring to the drawings.

In a possible embodiment, the test arrangement comprises an antenna or an antenna system. The antenna or antenna system may be adapted to receive radio frequency signals and provide the received radio frequency signals to at least one of the impairment devices. The antenna or antenna system may be adapted to obtain a radio frequency signal from at least one of the impairment devices and to emit the obtained radio frequency signal. In particular, the respective at least one impairment device may be arranged in a signal path between the device under test and the antenna. This signal path may be part of the radio communication link of the device under test.

The antenna may be a single antenna for receiving or transmitting a radio frequency signal. For example, the antenna may be an antenna related to the device under test.

Alternatively, a separate antenna or antenna system may be used for receiving radio frequency signals and forwarding the received radio frequency signals to an impairment device or for emitting radio frequency signals provided by at least one of the impairment devices. Furthermore, an antenna system may be used comprising a number of two or more antenna elements for receiving or emitting radio frequency signals.

Accordingly, a transmission or reception direction can be set up by means of such an antenna system. Moreover, separate antennas may be used for receiving or transmitting separate polarizations of a radio frequency signal. It is understood, that any appropriate antenna or antenna system may be used for receiving or transmitting the radio frequency signals.

In a possible embodiment, the antenna or the antenna system may comprise a directional antenna or antenna system. Accordingly, the direction for receiving radio frequency signals or emitting radio frequency signals may be controlled by the respective antenna or antenna system. In particular, it may be possible to apply a single antenna which is configured to receive or emit radio frequency signals mainly in a predetermined direction. Furthermore, it may be possible to use an antenna system comprising multiple antenna elements which are controlled in order to achieve a directional reception or emission of radio frequency signals.

In a possible embodiment, the number of impairment devices comprises at least one internal impairment device and/or at least one external impairment device. The internal impairment device may be configured to apply an internal impairment of the device under test. The external impairment device may be configured to apply an external impairment, i.e. an impairment on a radio frequency signal on the radio communication link of the device under test outside the device under test.

An internal impairment may be considered, for example as an impairment which is applied within the device under test, in particular by modifying a configuration of the device under test or applying any appropriate impairment through software or hardware of the device under test. An external impairment may be considered as an impairment which is applied to a signal, in particular a radio frequency signal, which is applied to the respective signal after the signal has been output by the device under test or before the respective signal is input to the device under test. For example, such an external impairment may be applied to a radio frequency signal by applying a modification to the signal in a signal path between an output of the device under test and an input of a connected antenna or antenna system. However, it is understood, that an external impairment is not limited to only the signal path between the device under test and an antenna. Moreover, it may be also possible to apply such an external impairment almost everywhere on the wireless communication link between the device under test and an associated communication partner.

In a possible embodiment, the internal impairment device may be adapted to modify a number of one or more setup parameters of the device under test. For example, the internal impairment device may be adapted to modify a tuning of the device under test, e.g. to achieve a de-tuning of the device under test. In such a manner, it may be possible to simulate a frequency shift which is caused, for example, due to a high speed movement of the device under test. Furthermore, it may be possible to modify any other appropriate parameter of the device under test. For example, an internal impairment device may also initiate a predetermined operation, for example a handover, a change of a transmission channel, or the like. Furthermore, it may be also possible to apply modification, which cause, for example partial or full loss of information.

However, it is understood, that any other appropriate impairment may be also applied to the setup or the operation of the device under test.

In a possible embodiment, the internal impairment device may be adapted to apply a modified attenuation or amplification of an internal signal of the device under test. The internal impairment device may be also adapted to modify a frequency tuning of the device under test, or to apply any other appropriate modification of the device under test in order to influence the signal path for achieving an impairment or an effect corresponding to an impairment of the signal path.

In a possible embodiment, the external impairment device may comprise at least one of an attenuator for attenuating a radio frequency signal in the communication link of the device under test, a filter for filtering the radio frequency signal in the communication link, a fader for applying a predefined signal degradation of the radio frequency signal in the communication link, and a signal generator for introducing an impairment signal into the radio frequency signal in the communication link.

By introducing such an external impairment device, it may be possible to impair or modify the respective radio frequency signal in the communication link between the device under test and a further communication partner. In particular, it is possible to modify the radio frequency signal provided to the device under test in order to simulate any kind of impairment in the signal path from the communication partner to the device under test. However, it is also possible to apply an impairment in the opposite direction, i.e. in a signal path from the device under test to the external communication partner. In this way, it is possible to apply any kind of disturbances caused by geographical properties in an environment, or by further devices in the communication environment between the device under test and the further communication partner. For example, it may be possible to apply an impairment which corresponds to an increased attenuation due to disturbances in the transmission path, or to provide an impairment which corresponds to disturbances due to the transmission of further wireless devices in the environment of the device under test, or additional signals caused by reflections on a building or a mountain in the environment. Furthermore, it may be also possible to simulate a loss of a particular frequency range or one or more particular channels by filtering the respective frequencies in the radio frequency signal. However, it is understood, that the present invention is not limited to the above-mentioned examples. Moreover, any other kind of impairment may be also applied in the communication link in order to simulate an appropriate disturbance of the radio frequency signal.

In a possible embodiment, the filter of the external impairment device may comprise at least one of a bandpass filter, a highpass filter, a lowpass filter, a bandstop filter or a notch filter. However, it is understood, that the present invention is not limited to the before mentioned types of filters. Moreover, any other appropriate filter may be also applied. The filter may be any kind of analogue filter for filtering a desired frequency or frequency range. For example, such a filter may comprise hardware elements such as resistors, capacitors and/or inductors. Moreover, it may be also possible to apply digital filter for filtering the signal. In particular, it may be possible to receive an analogue signal, convert the received signal to a digital signal, apply a digital filter and subsequently convert the filtered digital signal to an analogue signal. However, any other kind of filtering the signal on the radio communication link may be also applied.

In a possible embodiment, the signal generator may be adapted to generate an impairment signal corresponding to a noise signal, a reflection signal, an interfering signal, a signal simulating a further wireless device or any other appropriate impairment signal. Furthermore, the external impairment device may comprise a mixer or adder for combining the additionally provided impairment signal provided by the signal generator and the original signal of the communication link.

Furthermore, a directional coupler may be applied for adding such an impairment signal only to signals in a single direction to or from the device under test. However, it is understood, that the present invention is not limited to the before mentioned examples. Moreover, any other kind or impairment filter may be generated and applied to the radio communication link of the device under test.

In a possible embodiment, the test arrangement comprises a position detector. The position detector may be adapted to determine a local position, in particular a local position of the test arrangement. The impairment controller may be adapted to control at least one of the number of impairment devices based on the determined local position. For this purpose, the position detector may be communicatively coupled with the impairment controller to provide the data of a determined local position to the impairment controller. In particular, the position detector may determine an absolute local position, for instance longitudinal and lateral coordinates of a local position. Furthermore, it may be also possible that the position detector may determine a relative position with respect to a predetermined fixed position. Furthermore, the position detector may also provide data relating to a movement of the test arrangement with respect to a predetermined local position. For example, the position detector may provide data relating to a direction and a speed for specifying the movement of the test arrangement. However, it is understood, that the position detector may also provide any other kind of appropriate data for determining an absolute or relative position of the test arrangement. Based on the provided data for the local position of the test arrangement, the impairment controller may control the impairment devices accordingly. In particular, the impairment applied by the individual impairment devices may be modified with respect to a current position of the test arrangement. In this way, the impairment of the radio frequency situation, in particular the impairment of the radio frequency signals on the radio communication link may be modified with respect to a position of the test arrangement or with respect to a movement of the test arrangement. In this way, it is possible to simulate changing impairment effects during a test when the test arrangement is moving.

In a possible embodiment, the position detector may comprise a global navigation satellite system (GLASS). For example, the position detector may determine a local position based on a global position system (GPS) or any other appropriate system for determining a local position based on signals received from a number of satellites. However, it is understood, that the determination of a local position of the test arrangement is not limited to only a position detector based on signals from satellites. Moreover, any other appropriate system for determining a local position of the test arrangement may be also used. For example, a relative local position may be determined based on data provided from any kind of appropriate sensors like an electronic compass, an acceleration sensor, or any other sensor for determining an orientation or a movement of the test arrangement. Accordingly, the movement of the test arrangement can be determined and impairments may be applied depending on the determined local position. For example, it may be possible to simulate a movement such as a walk or drive through a predetermined geographical area, even though such movement or drive is performed in a different local area.

In a possible embodiment, the test arrangement may comprise a network scanner for receiving network signals. The received network signals may be provided from the network scanner to the impairment controller. Accordingly, the impairment controller may further take into consideration the received network signals when controlling the impairment of the impairment devices. In particular, the impairment of one or more of the impairment devices may be modified with respect to a received network signal received from a network scanner. For example, a particular impairment may be only applied, if the network scanner receives one or more predetermined network signals. Furthermore, an impairment may be activated, deactivated or changed/modified depending on the network signals received by the network scanner.

In a possible embodiment, the impairment controller comprises an impairment memory for storing predetermined impairment conditions. The impairment controller may be adapted to apply test impairments to the radio communication link of the device under test based on the predetermined impairment conditions stored in the impairment memory.

Further to the impairment memory, the impairment controller may also comprise a processor and an instruction memory for storing instructions to be carried out by the processor. In particular, the processor may be instructed to read out the impairment conditions from the impairment memory and control a number of impairment devices to perform an impairment based on the impairment conditions stored in the impairment memory. In particular, the impairment conditions stored in the impairment memory may be stored in association with absolute or relative spatial positions. Accordingly, the impairment controller may determine a current spatial position of the test arrangement and apply an impairment based on the current local position and the impairment conditions stored in the impairment memory. The impairment conditions may comprise any kind of specifications for applying an appropriate impairment. For example, the impairment conditions may specify an attenuation of a radio frequency signal, parameters for filtering a radio frequency signal, e.g. a frequency range to be filtered or a degree for attenuating a desired frequency range by the filter, any other kinds of filter parameters, parameters for specifying an additional signal to be added in the radio communication link, parameters for applying a frequency shift or a de-tuning of the device under test, or any other appropriate parameter for applying an impairment during a test of the device under test.

In a possible embodiment, the test arrangement may further comprise an acquisition device for determining impairment conditions on the radio communication link of the device under test. The acquisition device may further determine a corresponding local position for the determined impairment condition. The acquisition device may further store the determined impairment conditions and the corresponding local position in the impairment memory.

Accordingly, the test arrangement may acquire impairment conditions during an operation of the test arrangement in the field at a desired geographical area or a particular route. In particular, the acquisition device may analyze the signals in the communication link in order to determine impairments such as attenuations of signals, additional signals in the communication link, for example caused by reflections or other wireless communication devices, frequency shifts due to a high speed movement, noise, interferences, or any other kind of impairment in a radio communication link of a device under test. Furthermore, the identified impairments may be stored together with a corresponding spatial position. In this way, it is possible to acquire impairment information relating to a particular geographical area or route. Thus, based on these acquired data it is possible to perform an impairment in the communication link at a later time, even when the test arrangement is located at a different geographical position.

In a possible embodiment, the impairment controller is adapted to apply predetermined impairment conditions relating to impairments of a predefined route or a predefined geographical/local area. In particular, it may be possible to define, e.g. by a user, in advance a particular virtual geographical area or a desired route on which a device under test shall be moved, and based on this specification, the corresponding impairments may be retrieved from the impairment memory. Accordingly, the retrieved impairment conditions may be set up by the impairment controller to the impairment devices and the impairment devices can apply the respective impairments to the communication link, even if the device under test is located or moved at a completely different geographical position. Thus, a testing of the device under test can be performed based on conditions of a particular geographical area or a route, even if the device under test is not located at this geographical position.

In a possible embodiment, the predetermined impairment conditions may comprise a predetermined setup of parameters for the number of impairment devices or desired values for the radio frequency signal transmitted by the radio communication link. By specifying detailed setup parameters for the impairment devices, the impairment controller can easily set up the impairment devices accordingly. Furthermore, by specifying desired values for the radio frequency signal or for the impairment to be applied, it may be possible to control the respective impairment devices adaptively or iteratively in order to achieve the desired values. Hence, it is possible to obtain a predetermined impairment even if the respective parameters for setup conditions of an impairment device are not known in advance.

In a possible embodiment, the test arrangement may comprise a vehicle for carrying the device under test, the test controller, the number of impairment devices and the impairment controller. For example, the vehicle may be a vehicle which can be driven manually by an operator. Furthermore, it may be also possible to use a partially or completely autonomous driven vehicle for carrying the test equipment. Accordingly, the device under test and the further required devices for controlling the test procedure can be moved around for carrying out the tests. Furthermore, the test arrangement may be also moved around for acquiring parameters, in particular for acquiring parameters specifying an impairment in the communication link of the device under test. Such data relating to the impairment may be used for a successive test procedure as already described above.

BRIEF DESCRIPTIONS OF THE DRAWINGS

For a more complete understanding of the present invention and advantages thereof, reference is now made to the following description taking in conjunction with the accompanying drawings. The invention is explained in more detail below using exemplary embodiments which are specified in the schematic figures and drawings, in which.

Figure 1:
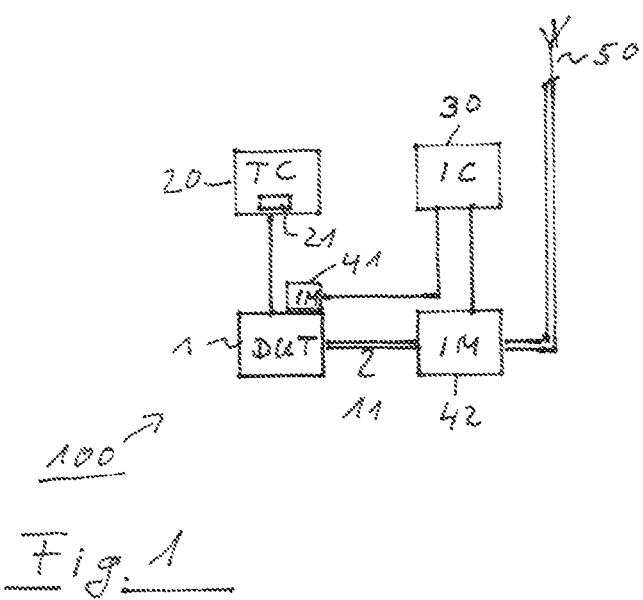
FIG. 1 shows a block diagram of an embodiment of a test arrangement according to the present invention.

The appended drawings are intended to provide further understanding of the embodiments of the invention. The illustrated embodiments, in conjunction with the description, help to explain principles and concepts of the invention. Other embodiments and many of the advantages mentioned become apparent in view of the drawings. The elements in the drawings are not necessarily shown in scale.

In the drawings, like, functionally equivalent and identical operation elements, features and components are provided with same reference signs in each case, unless stated otherwise.

DETAILED DESCRIPTION OF THE DRAWINGS

FIG. 1 shows a block diagram of an embodiment of a test arrangement 100. The test arrangement 100 comprises a test controller, TC, 20. The test controller 20 is communicatively coupled with a device under test 1. For example, test controller 20 may comprise an interface, IF, 21 for coupling the test controller 20 with the device under test, DUT, 1. Accordingly, test controller 10 may receive signals from the device under test 1 and analyze the received signals in order to evaluate the operation and the performance of the device under test 1. For this purpose, test controller 20 may comprise an interface 21 which can receive the signals from the device under test 1. It is understood, that any appropriate link for coupling the test controller 10 with the device under test 1 may be possible. For example, a wired connection between the test controller 10 and the device under test 1 may be applied. However, it may also be possible to apply a wireless connection, for example an optical link or the like for coupling test controller 10 and device under test 1.

The device under test 1 may receive radio frequency signals and/or emit radio frequency signals. In particular, a radio communication link 11 may be used for receiving and transmitting the radio frequency signals. For example, the radio communication link 11 of the device under test 1 may be coupled with an antenna or antenna system 50 for emitting radio frequency signals and/or receiving radio frequency signals.

The test arrangement 100 may further comprise a number of one or more impairment devices, ID, 41, 42. The impairment devices 41, 42 may be controlled by an impairment controller, IC, 30. For this purpose, the impairment controller 30 may be communicatively coupled with the number of impairment devices 41, 42. For example, each impairment device 41, 42 may be separately coupled with impairment controller 30. Furthermore, it may be also possible to connect impairment controller 30 and the number of impairment devices 41, 42 by means of a bus system or the like. Any appropriate protocol for communication between the impairment controller 30 and the impairment devices 41, 42 may be possible. The number of impairment devices 41, 42 may comprise internal impairment devices 41 and/or external impairment devices 42. An internal impairment device 41 may apply an internal impairment to the device under test 1, i.e. an impairment of the device under test 1 based on a setting, a configuration or a modification within the device under test 1. Furthermore, an external impairment device 42 may apply an impairment on a radio frequency signal which is transmitted on the radio communication link 11.

An internal impairment device 41 may apply, for example, a modification in the setting of the device under test 1 which may cause an impairment. For example, a tuning of the device under test 1 may be changed in order to achieve a de-tuning of the device under test 1 with respect to a desired frequency or channel. In this way, it may be possible to achieve an impairment corresponding to a frequency shift of a radio frequency signal. Such a frequency shift may be caused, for example due to a high speed movement of the device under test 1 or a communication partner. Such an effect is known, for example, as Doppler Effect. Furthermore, an internal impairment device 41 may also modify an amplification or attenuation of a signal within the device under test 1, the internal impairment device 41 may initiate, block or limit a handover procedure from one communication partner to another communication partner of the device under test 1, enable or disable a change of the frequency or channel, increase or decrease an error rate of an operation of the device under test 1 or any other kind of impairment during the operation of the device under test 1.

An external impairment device 42 may apply any kind of impairment on a radio frequency signal provided to the device under test 1 and/or output by the device under test 1. For example, an external impairment device 42 may apply a predetermined attenuation on a radio frequency signal in the radio communication link 11. Further, an external impairment device 42 may filter a predetermined frequency or frequency range, or one or more predetermined transmission/reception channels. For this purpose, any kind of appropriate highpass filter, lowpass filter, bandpass filter, bandstop filter, notch filter or any other kind of filter may be included in the respective impairment device 42. Furthermore, an external impairment device 42 may also comprise a signal generator for generating an impairment signal which may be added to a radio frequency signal in the radio communication link 11. For example, such a signal may comprise any kind of noise. Furthermore, such a signal may relate to a signal for simulating another wireless communication device in an environment of the device under test 1. Furthermore, it may be possible to generate a signal which simulates a corresponding reflection signal. Furthermore, any other kind of signal may be generated and added to a signal in the radio communication link 11. The signal generated by a signal generator of an external impairment device 42 may be added to the radio communication link 11 by means of a mixer or any other appropriate device for adding a radio frequency signal. In particular, a directional coupler may be used in order to add an impairment signal only for a predetermined direction of the radio communication link 11. For example, an impairment signal may be added only for providing the signal to the device under test 1. Alternatively, an impairment signal may be added only for a direction from the device under test 1 to the antenna 50.

Accordingly, it is possible to apply impairments to the test arrangement 100 with the device under test 1 based on predetermined impairment conditions. In particular, impairment controller 30 may control the internal and/or external impairment devices 41, 42 for applying desired impairments. Accordingly, impairments can be generated and applied to the test arrangement without moving the device under test 1 to a particular geographical position. Moreover, desired impairments can be applied based on the control of impairment controller 30 at any appropriate spatial area.

Accordingly, by attenuating signals in the radio communication link or filtering predetermined frequencies or channels in the signal of the radio communication link, it is possible to simulate a loss of a communication partner. In particular, it is possible to simulate, that for example one or more of multiple communication partners are lost or do not provide appropriate communication links. For example, it can be simulated that one or more base stations are not available for a communication with a mobile communication device. Furthermore, it is possible to simulate a roaming, a cell change, a handover or the like. Additionally, interfering effects with further communication devices, neighboring transmission partners, e.g. base stations, or the like can be simulated. By attenuating a signal it may be possible to simulate a movement within a building even though the test procedure is carried out outside the building. Furthermore, simulations of desired geographical conditions like valleys, mountains, cities with high buildings, wide areas with only limited coverage or the like can be simulated. In addition, it is also possible to simulate desired characteristics of antennas, like directionally, gain, frequency characteristics, impedance mismatch, cabling affects, etc. However, it is understood, that the above-mentioned scenarios do not limit the possibilities of the present invention. Moreover, it may be also possible to simulate or emulate any other kind of test scenario without moving the device under test to a particular geographical region.

Figure 2:
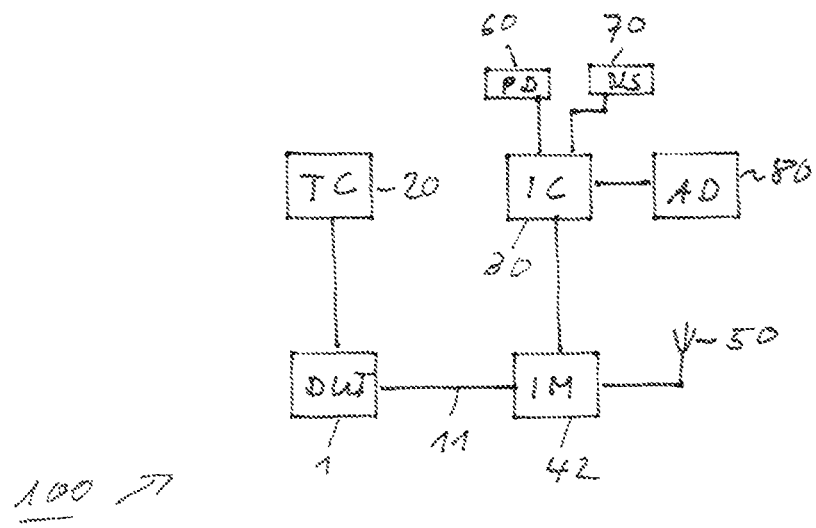
FIG. 2 shows a block diagram of another embodiment of a test arrangement according to the present invention.

FIG. 2 shows a block diagram of a further embodiment of a test arrangement 100 for testing a device under test 1. The test arrangement 100 in FIG. 2 mainly corresponds to the previously described test arrangement. Thus, the description in connection with the previous embodiment is also valid for this embodiment. The test arrangement according to FIG. 2 further comprises a position detector, PD, 60 and/or a network scanner, NS, 70. Furthermore, the test arrangement 100 may comprise an acquisition device, AD, 80. However, it is understood, that the test arrangement 100 may further comprise any other appropriate device which may be useful for performing a test of the device under test 1.

Position detector 60 may be, for example, a global navigation satellite system (GLASS). For example, position detector 60 may use a global position system (GPS) or any other appropriate system for determining a spatial position. For example, position detector 60 may provide a spatial position in terms of longitudinal and lateral coordinates. However, any other scheme for determining a position and providing appropriate position information may be also possible. Furthermore, position detector 60 may also provide a relative position with respect to a predetermined initial location. For example, position detector 60 may determine an orientation and/or a movement speed. Based on the determined information, position detector 60 may determine a relative movement with respect to an initial spatial position. Furthermore, position detector 60 may comprise an acceleration sensor or the like. Accordingly, the determined absolute or relative position which has been determined by position detector 60 may be provided to impairment controller 30. Impairment controller 30 may determine appropriate impairment conditions based on a current position of the test arrangement 100, in particular based on a position determined by position detector 60. Accordingly, the impairment conditions which are applied by the impairment devices 41, 42 may be set up depending on a spatial position, an orientation, a movement speed, an acceleration or any other parameter, in particular any parameter which can be derived based on the spatial position and/or a variation of the spatial position of the test arrangement 100.

In particular, impairment controller 30 may comprise an impairment memory, IM, 32. Impairment memory 32 may store a number of impairment conditions. In particular, impairment conditions stored in impairment memory 32 may be used by impairment controller 30 to control the operation of the impairment devices 41, 42. For example, impairment memory 32 may provide a list of impairment conditions which can be applied successively in a predetermined time sequence. Moreover, it may be also possible to provide impairment conditions in association with a corresponding geographical position. For example, impairment memory 32 may provide predetermined impairment conditions for setting up the respective impairment devices 41, 42 based on a corresponding absolute or relative geographical position. Accordingly, it may be possible to select, for example by a user or a computer system, a desired geographical position and based on this geographical position, a test sequence may be performed. In particular, the test sequence may apply impairment conditions which correspond to the selected geographical position. It is understood, that the testing based on the specified geographical position is not limited to a single geographical position. Moreover, it may be also possible to specify a sequence of geographical positions, in particular to specify a route through a predetermined geographical area. Accordingly, the impairment conditions may be dynamically adapted by simulating a movement through a predetermined geographical area or along a predetermined route within a geographical area.

In particular, it may be possible to select or specify an initial geographical position, which may be different from a real geographical position of the test arrangement. Based on this specified (virtual) geographical position, the corresponding impairment conditions may be read out the impairment memory 32. Furthermore, a movement of the test arrangement 100 may be determined based on the position information provided by position detector 60. Accordingly, it is possible to simulate a movement of the test arrangement through the virtual geographical area by moving the test arrangement 100 accordingly, even though the test arrangement is located at a different geographical area.

The operations for reading out the impairment conditions from impairment memory 32 and controlling the impairment of the internal and external impairment devices 41, 42 may be performed, for example, by a processor 31 of the impairment controller 30.

Furthermore, the test arrangement 100 may comprise a network scanner 70 for scanning network signals. Based on the received network signals, impairment controller 30 may determine properties of the present radio frequency environment and adapt the impairment devices 41, 42 accordingly. For example, network scanner 70 may identify radio frequency signals in the present environment which should be not taken into account when performing a test by the test arrangement 100. In this way, impairment controller 30 may cause the impairment devices 41, 42 to filter out the respective signals. Furthermore, any other appropriate operation for setting up the impairment devices 41, 42 based on network signals received by a network scanner 70 may be also possible.

The impairment conditions, in particular the impairment conditions specified in impairment memory 32 of impairment controller 30 may be provided by manual user input or by simulated computations which have been performed in advance. Furthermore, it may be also possible to determine impairment conditions by scanning a desired geographical area. For this purpose, acquisition device 80 may acquire the current radio frequency properties in an environment of the test arrangement 100. Based on the acquired radio frequency conditions, acquisition device 80 may determine appropriate impairment conditions. These determined impairment conditions may comprise, for example, identified signals. The identified signals may comprise interfering signals, signals emitted neighboring transmission devices, for example a base stations, further mobile communication devices or the like, reflection of signals due to geographical constraints such as mountains or valleys, attenuation of signals due to geographical configurations, buildings, etc. or any other kind of impairments. Acquisition device 80 may analyze the received signals, determine appropriate impairment conditions and store these impairment conditions, for example in impairment memory 32 of the impairment controller 30. However, impairment memory 32 by be also located outside the impairment controller 30. Furthermore, a corresponding geographical position may be also stored in association with the determined impairment conditions. Accordingly, it is possible to scan geographical area in order to acquire the respective impairment conditions which can serve as a basis for further tests.

Figure 3:
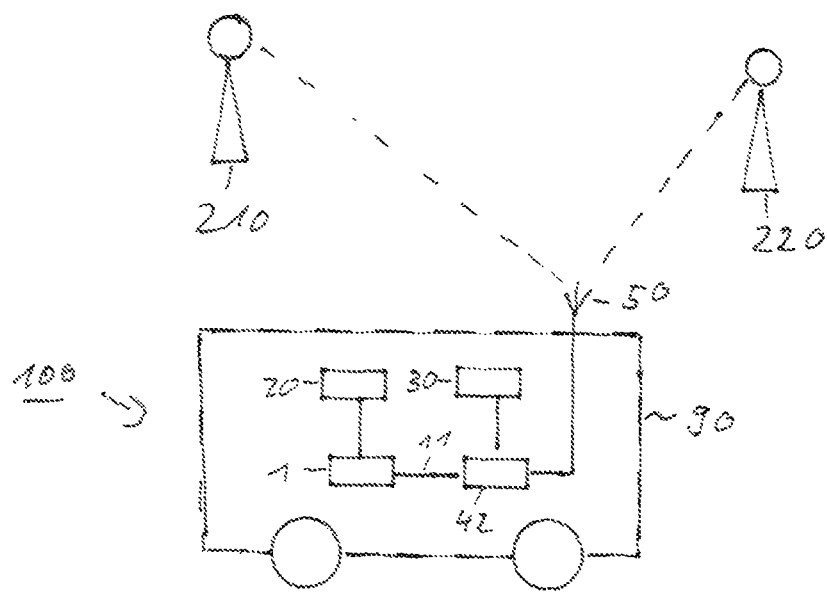
FIG. 3 shows a block diagram of another embodiment of a test arrangement according to the present invention.

FIG. 3 illustrates a further embodiment of a test arrangement 100 according to an embodiment. The test arrangement in FIG. 3 mainly corresponds to the test arrangements which have been further described in combination with FIG. 1 and FIG. 2. Thus, the explanation of the test arrangement 100 of FIG. 1 and FIG. 2 is also valid for the test arrangement in FIG. 3.

Furthermore, the test arrangement 100 in FIG. 3 further comprises a vehicle 90. Accordingly, test arrangement 100 can be moved around by means of the vehicle 90. In particular, vehicle 90 may be a manually driven vehicle like a car or a truck. Furthermore, vehicle 90 may be also a fully or partially autonomous driven vehicle or a vehicle which can be remotely controlled. Accordingly, the test arrangement 100 can be moved around by means of vehicle 90.

As further shown in FIG. 3, test arrangement 100 may be communicatively coupled via wireless communication links with one or more communication partners 210, 220. For example, the communication partners 210, 220 may be a base station, a further wireless communication device or any other device for transmitting and/or receiving wireless signals.

Figure 4:
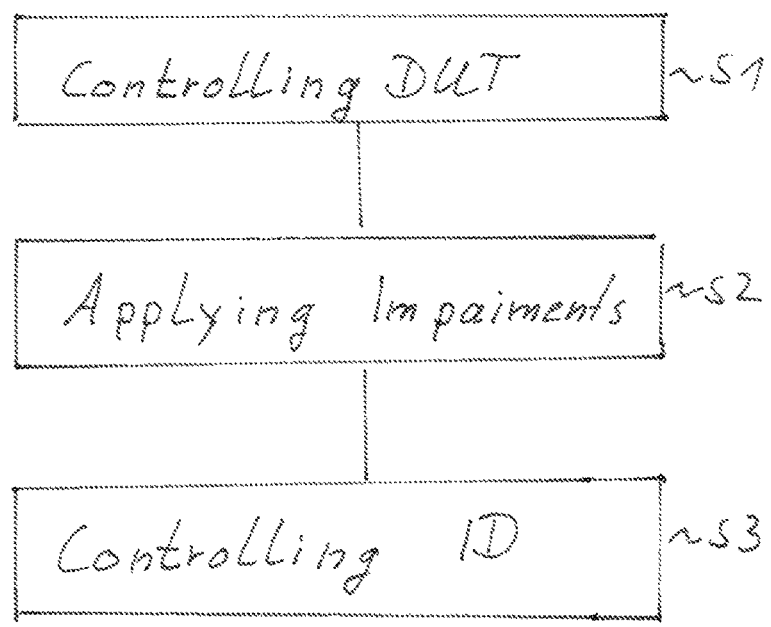
FIG. 4 shows a flow chart of an embodiment of a test method according to the present invention.

FIG. 4 shows a flowchart of a test method for testing a device under test 1 according to an embodiment. The test method comprises controlling (S1) the device under test 1 by a test controller 30 to perform a predetermined test operation. The method further comprises applying (S2) test impairments to a radio communication link 11 of the device under test 1 by a number of impairment devices 41, 42. The method further comprises controlling (S3) the number of impairment devices 41, 42 by an impairment controller 30.

The method may further comprise providing predetermined impairment conditions and corresponding local positions by an impairment memory 32. Further a predetermined route or a predetermined local area may be received by an input device. A test sequence may be determined, wherein the test sequence comprises impairment conditions based on the provided impairment conditions and the received route or local area. Finally, test impairments may be applied based on the determined test sequence.

Summarizing, the present invention relates to a test arrangement and a test method for testing a device under test. The device under test may be tested by means of a test controller. Furthermore, a number of impairment devices are provided for applying impairments on a radio communication link of the device under test. The impairment devices may be controlled by an impairment controller. In this way, it is possible to apply impairments corresponding to impairments of a particular geographical area or a desired route, without moving the device under test to the respective geographical position. Accordingly, impairments of a particular geographical area can be applied without moving the test arrangement to the respective geographical area.

The invention claimed is:

1. A test arrangement for testing a device under test, the test arrangement comprising:
 a test controller comprising a control interface for interacting with the device under test, said test controller being adapted to control the device under test to perform a predetermined test operation;
 a number of impairment devices for applying test impairments to a radio communication link of the device under test;
 an impairment memory for storing predetermined impairment conditions; and
 an impairment controller communicatively coupled to said number of impairment devices and adapted to control said number of impairment devices to apply the test impairments,
 wherein said impairment controller is adapted to apply test impairments to the radio communication link of the device under test based on the predetermined impairment conditions stored in said memory,
 wherein said impairment controller is adapted to apply predetermined impairment conditions relating to impairments on a predefined mute or in a predefined geographical area.

2. The test arrangement according to claim 1, comprising an antenna for receiving a radio frequency signal and providing the received radio frequency signal to at least one of the impairment devices, or obtaining a radio frequency signal from at least one of the impairment devices and emitting in the obtained radio frequency signal,
 wherein at least one impairment device is arranged in a signal path between the device under test and the antenna.

3. The test arrangement according to claim 2, wherein the antenna comprises a directional antenna.

4. The test arrangement according to claim 1, wherein the number of impairment devices comprises at least one internal impairment device for applying an internal impairment of the device under test, and/or at least one external impairment device for applying an impairment to the radio communication link of the device under test.

5. The test arrangement according to claim 4, wherein said internal impairment device being adapted to modify a setup parameter of the device under test.

6. The test arrangement according to claim 4, wherein said internal impairment device being adapted to apply an attenuation or amplification of an internal signal of the device under test or to modify a frequency tuning of the device under test.

7. The test arrangement according to claim 4, wherein said external impairment device comprises at least one of an attenuator for attenuating a radio frequency signal in the communication link, a filter for filtering the radio frequency signal in the communication link, a fader for applying a predetermined signal degradation of the radio frequency signal in the communication link, and a signal generator for introducing an impairment signal into the radio frequency signal in the communication link.

8. The test arrangement according to claim 7, wherein said filter comprises at least one of a bandpass filter, a highpass filter, a lowpass filter, a bandstop filter and a notch filter.

9. The test arrangement according to claim 1, comprising a position detector for determining a local position, wherein said impairment controller is adapted to control the number of impairment devices based on the determined local position.

10. The test arrangement according to claim 9, wherein the position detector comprises a global navigation satellite system.

11. The test arrangement according to claim 1, comprising a network scanner for receiving network signals,
 wherein said impairment controller is adapted to control said number of impairment devices based on the received network signals.

12. The test arrangement according to claim 1, comprising an acquisition device for determining impairment conditions on the radio communication link of the device under test and a local position corresponding to the respective impairment condition, and for storing the determined impairment conditions and the corresponding local position in the impairment memory.

13. The test arrangement according to claim 1, wherein said predetermined impairment conditions comprise predetermined set-up of parameters for the number of impairment devices or desired values for a radio frequency signal transmitted by the radio communication link.

14. The test arrangement according to claim 1, comprising a vehicle for carrying the device under test, the test controller, the number of impairment devices and the impairment controller.

15. A test method for testing a device under test, the test method comprising:
 controlling the device under test by a test controller to perform a predetermined test operation;
 applying test impairments to a radio communication link of the device under test by a number of impairment devices; and
 controlling said number of impairment devices by an impairment controller,
 the method further comprises:
  providing predetermined impairment conditions and corresponding local positions by an impairment memory;
  receiving a predetermined route or local area by an input device;
  determining a test sequence comprising impairment conditions based on the provided impairment conditions and the received route or local area; and
  applying the test impairments based on the determined test sequence.

* * * * *